United States Patent [19]
Pattison et al.

[11] Patent Number: 5,999,936
[45] Date of Patent: Dec. 7, 1999

[54] METHOD AND APPARATUS FOR COMPRESSING AND DECOMPRESSING SEQUENTIAL RECORDS IN A COMPUTER SYSTEM

[75] Inventors: Ian Pattison, Edinburgh, United Kingdom; Wouter Senf, Blaricum, Netherlands

[73] Assignee: Compaq Computer Corporation, Houston, Tex.

[21] Appl. No.: 08/865,405

[22] Filed: Jun. 2, 1997

[51] Int. Cl.$^6$ ........................................... G06F 17/30
[52] U.S. Cl. .................................................. 707/101
[58] Field of Search ........................................ 707/101

[56] References Cited

U.S. PATENT DOCUMENTS 4,074,254  2/1978  Belser et al. ........................... 365/231
4,701,745  10/1987  Waterworth ........................... 340/347
5,710,919  1/1998  Rail ........................................ 707/101

OTHER PUBLICATIONS

McFadden et al. Data Base Management, pp. 303–309, 1985.

*Primary Examiner*—Jack M Choules
*Attorney, Agent, or Firm*—Fenwick & West LLP

[57] ABSTRACT

A system for compressing and decompressing sequential records to store only those parts of a record which differ from the previous record. The system for compressing includes a bit map which indicates which parts of a record if any are the same as the preceding record. The system enables compression and decompression of records without the need to access additional blocks and perform additional disk I/Os to obtain the expanded version of a given compressed record.

17 Claims, 12 Drawing Sheets

UNCOMPRESSED DATABASE

METHOD AND APPARATUS FOR COMPRESSING AND DECOMPRESSING SEQUENTIAL RECORDS IN A COMPUTER SYSTEM

BACKGROUND OF THE INVENTION

This invention relates to a method and apparatus for compressing and decompressing database records, and more specifically, to a method and apparatus for compressing and decompressing the key and non-key columns of records of Key-Sequenced Files.

As databases have increased in size, the cost of the storage required to hold a database has become one of the major influences governing system cost. Hence, any technique which decreases storage requirements, without diluting data content, can significantly reduce system cost. Such cost savings can be used to add capacity to another system component, (e.g., increase the number of CPUs in a system), or can simply be used to reduce the costs of purchasing and maintaining data storage.

One way of reducing storage requirements is to compress stored data. For example, compression of 50% of a 1 terabyte database, would save 500 GB of disk storage. Thus, a compression of 4 gigabyte disks, would reduce storage purchases by 125 disks. Compression of a database immediately reduces costs because there are fewer disks to fail or manage, and results in simpler and less expensive system maintenance. Other benefits of compression include use of less CPU processing time in the Input/Output (I/O) subsystem, less data transferred between disk and host, and fewer disk operations.

Structured Query Language (SQL) based Database Management Systems, such as Tandem's NonStop SQL, typically support on-line transaction processing (OLTP) systems; however, SQL based systems, are increasingly used to implement and support Decision Support Systems (DSS) databases. OLTP databases generally support the day-to-day operations of a business. In contrast, DSS databases maintain historical information to analyze trends and patterns in a business. Due to the enormous quantity of information stored in a DSS database, DSS databases generally become significantly large. For example, a supermarket DSS database generally includes unique records for the sale of each individual item from every customer over a period of 18 months.

The number of records in large databases, particularly DSS databases, can often be counted in billions rather than millions and require multi-tera bytes of storage. A typical DSS transaction may involve reading and processing tens of millions of records. A dimensional modeling approach is used when designing such a database and this approach often leads to a database design with a few extremely large tables, referred to as "fact tables," and several smaller tables referred to as "dimensional tables." Such a design often involves de-normalizing, as opposed to normalizing, the data. As a result, DSS databases often contain a large amount of redundant data with consecutive records varying only slightly from each other.

The excessive CPU time requirements to compress and decompress data is a major limitation of prior compression methods. Prior compression methods use sequential access, such that decompression of the n-th record in a table would require decompression of all previous records. A major limitation of these methods is that compression and decompression of a database's n-th record is costly and time-consuming, therefore, prior compression methods are not applied to structured production databases. In particularly, such compression methods are unacceptable for the random access requirements of a large production database, such as a DSS database. Since the contents of a DSS database generally are altered by bulk deletions and insertions, it is costly to use the prior methods to compress and decompress such large database. It is costly, for example, when a DSS database system adds a day or week's worth of transactions while deleting the oldest day/week transactions from the system.

One approach to reduce the high cost and time requirements of compressing large databases is the conventional prior art compression technique of "prefix key compression" as used in Tandem's NonStop SQL/MP. *Database Services Product Description of NonStop SQL/MP*, (http://tandem.com/INFOCTR/PROD_DES/NSSQLPD/NSSQLPD.HTM) (1995). Prefix key compression reduces the amount of disk space required to store keys of each record of a table by eliminating the leading characters duplicated from one key to the next. Each key contains a count of the leading bytes which it shares with the previous key.

However, current prefix key compression has limited benefits. For instance, the prefix key compression technique: (1) compresses only the key portion of a record, thus databases with a high redundancy of data in the non-key columns of a record do not benefit from prefix key compression; (2) eliminates only leading characters, hence common trailing or other groups of characters are not eliminated from the key; and, (3) requires the key to meet a number of restrictions. The key must: (a) begin with the first column in the table; (b) be contiguous; (c) be in ascending order; and, (d) belong to a restricted set of data types which exclude unsigned integers and large integers.

Although prior compression techniques have tried many different methods of compressing data, the failings and restrictions identified above, reveal that a solution to effectively compress the data of large databases, such as DSS databases, remains unmet. As a consequence, there is a need for an improved compression technique that is capable of compressing the key and non-key fields of a database and accessing the n-th record of a database without requiring decompression of all previous records.

SUMMARY OF THE INVENTION

The present invention provides for a method and apparatus for compressing and decompressing a sequence of records. A described embodiment of the invention provides for a method and apparatus for compressing and decompressing the key and non-key columns of SQL Key Sequenced data.

The invention provides for the decompression and compression of a database stored on disk. Generally, the database consists of files which are divided into a set of fixed-size data blocks (e.g., 4 Kilobytes, that contain data records). The invention generally provides for compression at the individual data block level, such that other data blocks and additional disk Inputs/Outputs (I/Os) are not required to obtain an expanded version of a compressed record.

A preferred embodiment of the invention provides for disk manager software to process and maintain a buffer of blocks read from disk in cache memory. The first record of each block is partially compressed. The disk manager retrieves subsequent records from the same block from memory and not from disk, therefore not requiring disk I/Os. The blocks in cache-memory stored in their compressed format, allow more records to be stored in the same cache memory, and allow for simplified cache memory management.

The invention provides for efficient decompression of consecutive records during a scan operation, while permitting access to individual records of a database. In the described embodiment of the invention, the compression stores only those parts of a record which differ from the previous record and which do not have a value of binary zero or of ASCII space, rather than storing the complete record. The first record in each data block is partially compressed, such that decompression of a given record does not require access to all preceding records in the data block.

As described herein, the instant invention is a record difference compression method of compressing a plurality of records of bytes of data, said plurality of records having bytes identical between a current record and a previous record, said method performed by a data processing system having a memory, comprising the steps of: dividing said current record and said previous record each into a plurality of small object binary; comparing said small object binary of said current record to said corresponding small object binary of said previous record; setting bits to a first type value in a compression bit map of a compression record for each of said small object binary of said current record that are equal to said one of said corresponding small object binary of said previous record; setting bits to a second type value in said compression bit map of said compression record for each of said small object binary of said current record that are not equal to said one of said corresponding small object binary of said previous record; and, writing said small object binary to said compression record for each of said small object binary of said current record not equal to said corresponding small object binary of said previous record.

As further described herein, the instant invention is a record difference decompression method of decompressing a plurality of compressed records of bytes of data, said plurality of compressed records having a current record and a previous record, said current record and said previous record each having a header and a compression bit map, said compression bit map of said current record including at least one encoded bit map value corresponding to a compressed small object binary, said method performed by a data processing system having a memory comprising the steps of: receiving a request for a compressed record; accessing the compressed record as said current record and accessing said previous record in said data processing system; reading said encoded bit map value of said compression bit map value of said current record; decoding said current record, wherein if said encoded bit map value has a first type value then said small object binary of said current record is decompressed to a value of said corresponding small object binary of the previous record, wherein if said encoded bit map value has a second type value then said small object binary of said current record is decompressed to a value of said corresponding small object binary of the current record; writing said small object binary to a decompressed record in the memory of said data processing system and, returning said decompressed record.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated mode of carrying out the invention. This description is made for the purpose of illustrating the general principles of the invention and is not to be taken in a limiting sense. The same reference numbers will be used to refer to the same or similar elements shown in the figures.

General Discussion

Figure 1A:
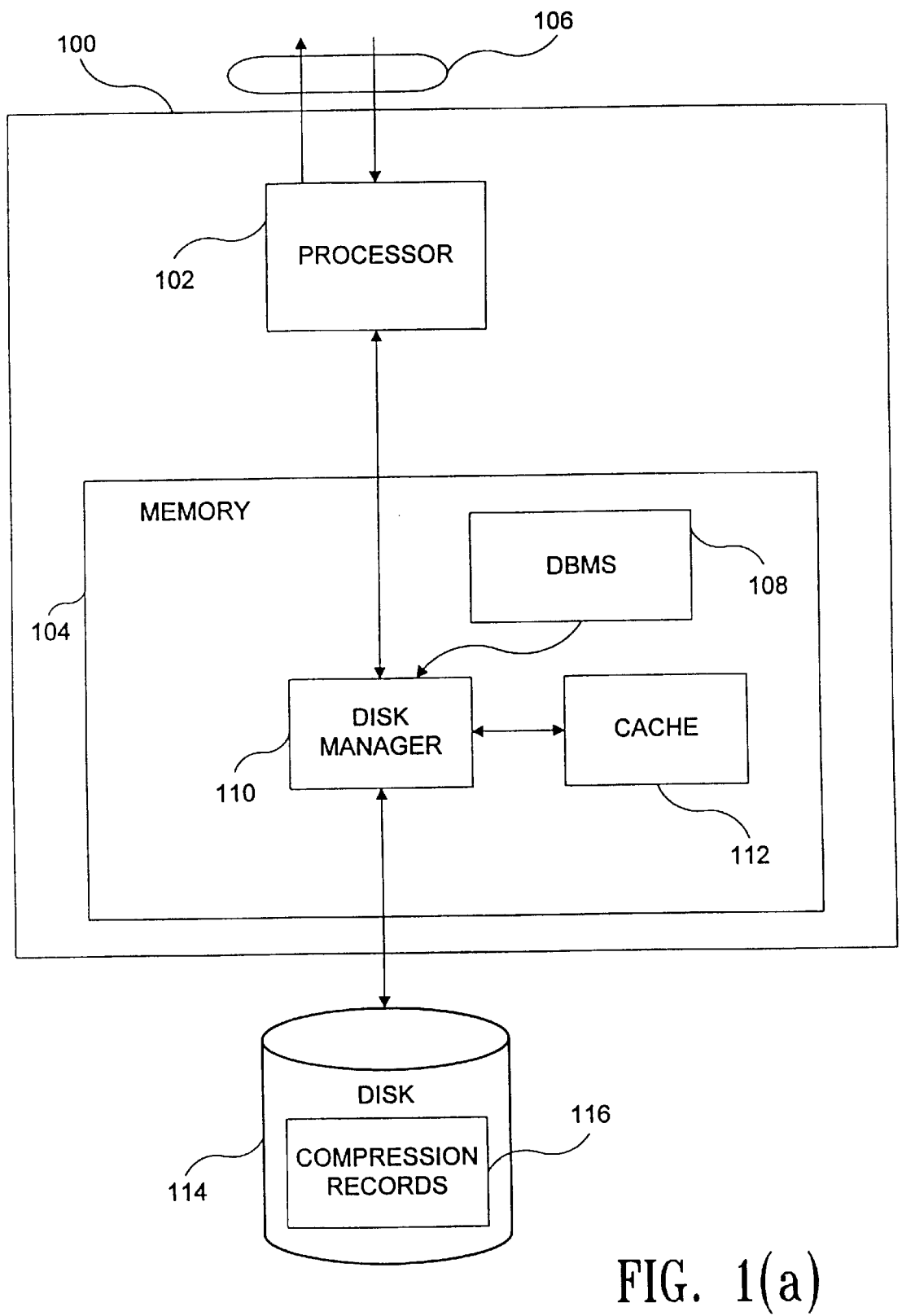
FIG. 1(a) is a block diagram of a computer system in accordance with a preferred embodiment of the present invention.

FIG. 1(a) is a block diagram of a computer system 100 in accordance with a preferred embodiment of the present invention. Computer system 100 includes a processor 102, a memory 104, input/output lines 106 and disk 114. Disk 114 contains compression records 116. It will be understood by a person of ordinary skill in the art that computer system 100 can also include numerous elements not shown in the Figure for the sake of clarity, such as disk drives, keyboards, display devices, network connections, additional memory, additional processors, etc.

Memory 104 includes a database management system (DBMS) 108 (e.g., Tandem's SQL/Massively Parallel (MP) DBMS and Tandem's SQL/ARK DBMS), disk manager software 110, such as Tandem's DP2 disk manager product, and a cache memory 112. Other embodiments of the present invention may include other elements in memory 104 not shown in FIG. 1(a), such as source code and dynamic executable (linked) code of other application software programs, OS (kernel software) mapfiles, a link-editor and a runtime editor, etc. Other embodiments of the present invention may not include cache memory 112.

Figure 1B:
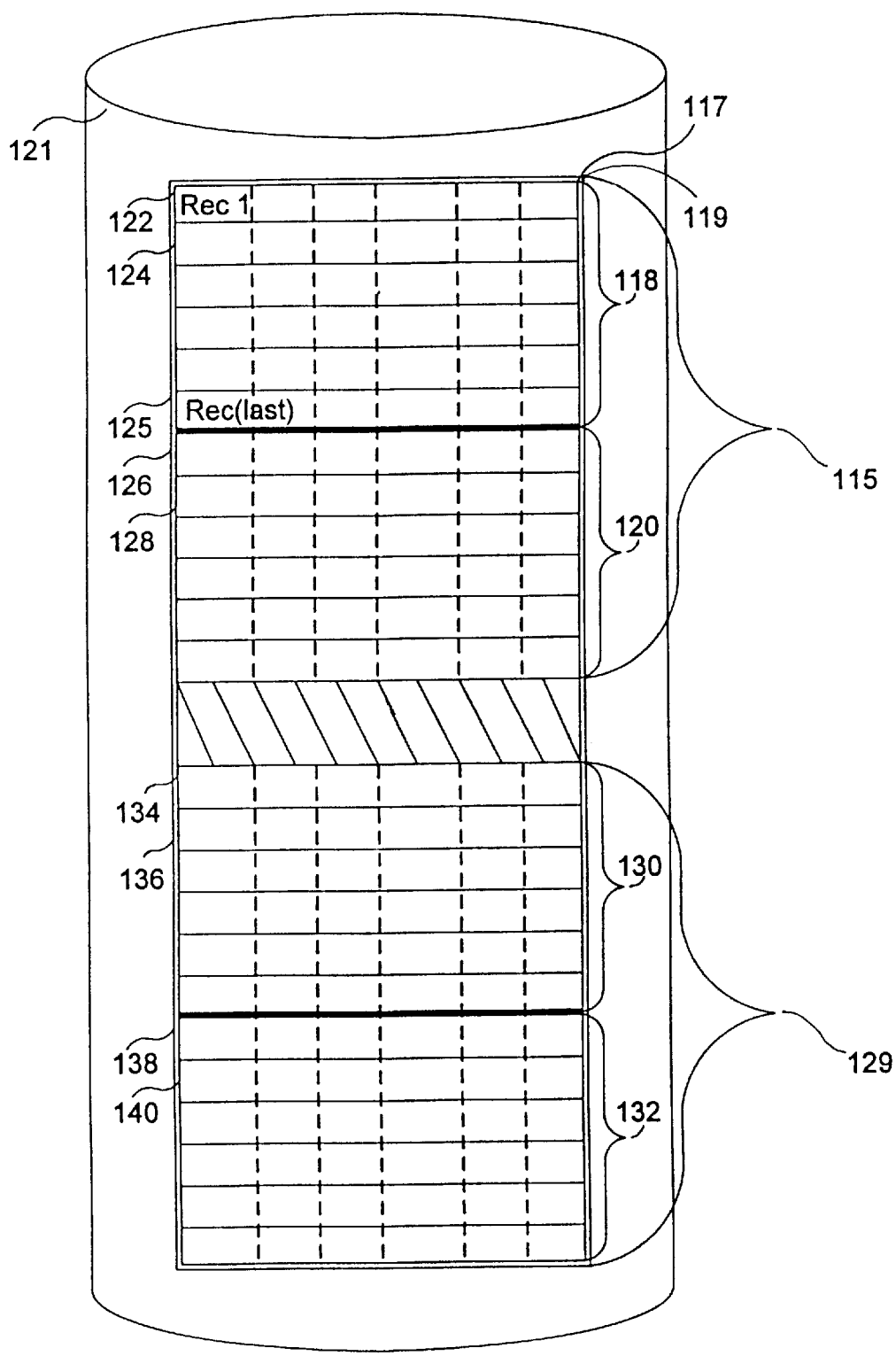
FIG. 1(b) is a diagram showing an example of an uncompressed database.

FIG. 1(b) is a diagram showing an uncompressed database 119 stored on a computer disk 121. As shown, the database 119 includes an SQL-key sequenced table 117. The table 117 includes a set of partitions, including partition(a) 115 and partition(b) 129, where each partition is stored as a separate file and divided into a set of fixed sized data blocks, generally 4 kilobytes, with each data block containing a plurality of records. As shown, partition(a) 115 includes block(1) 118 and block(2) 120. Block(1) 118 includes record (a) 122, record(b) 124, and a last record (rec$_{(last)}$) 125 of the block 118. Block(2) 120 includes record(a) 126 and record (b) 128. Partition(b) 129 includes block(1) 130 and block(2) 132. Block(1) 130 includes record(a) 134 and record(b) 136. Block(2) 132 includes record(a) 138 and record(b) 140.

The representation of the disk in FIG. 1(b) is merely for purposes of illustration. Accordingly, alternate embodiments may include other apparatus and methods of storing data on a disk. For example, in other embodiments, a disk may not include a table and instead may include block structured files or files that contain a sequence of records. As shown in FIG. 1(b), the data blocks preferably are arranged on the disk such that the data blocks include consecutive records contiguous on the disk. Although the embodiment shown is preferred for providing an efficient apparatus and method of the present invention, alternate embodiments may represent the records randomly and may include records of different lengths stored in the file stored on the disk 121. As explained, the method and invention of the present invention is far reaching in compressing and decompressing data and thus can be applied to a host of data structures stored on disk 121.

Figure 2A:
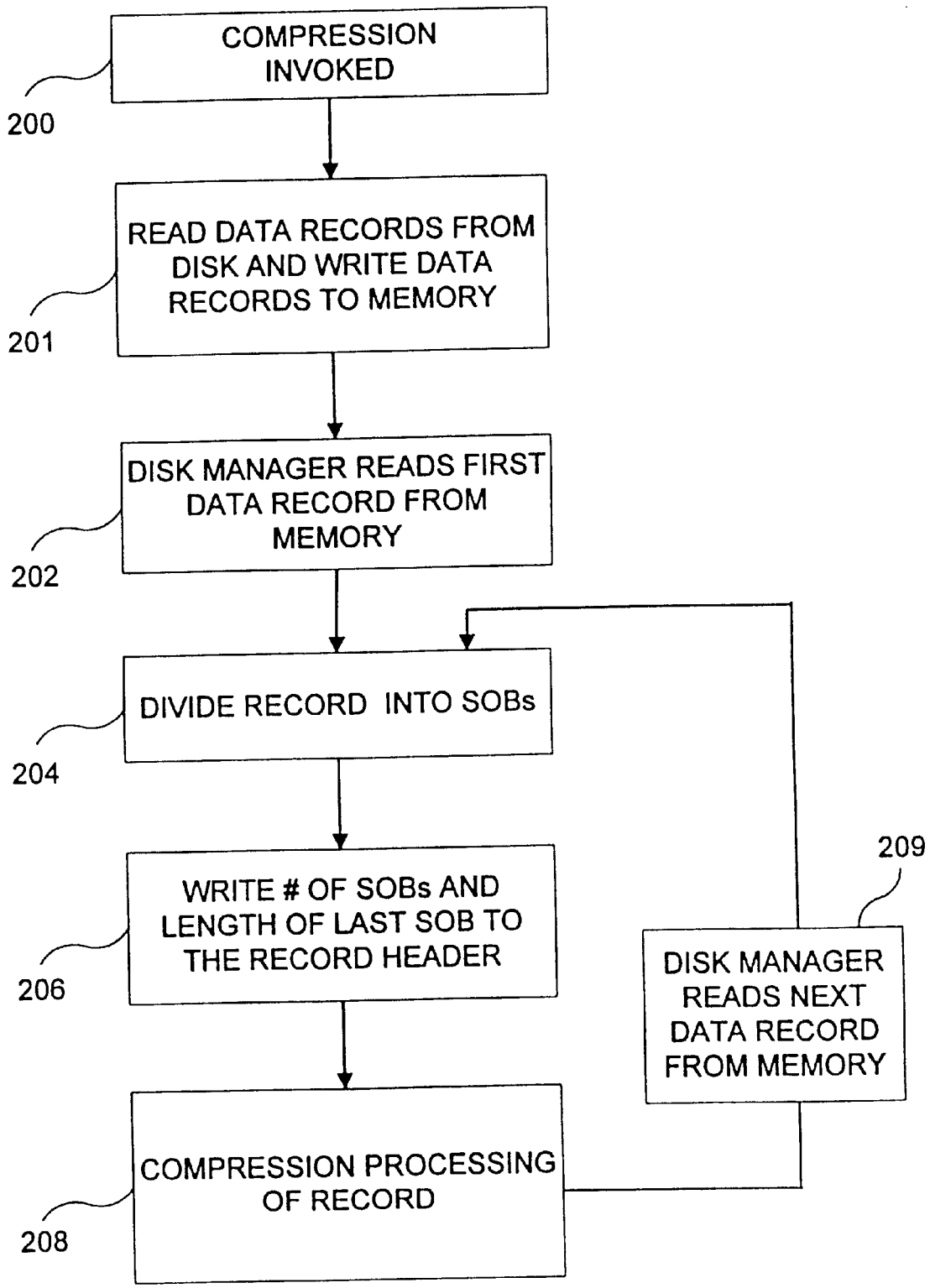
FIG. 2(a) is a flowchart showing a general overview of the compression process in accordance with the computer system of FIG. 1.

FIG. 2(a) is a flowchart showing a general overview of the compression process in accordance with the present invention of FIG. 1. It will be understood that the steps of all methods discussed herein are performed by processor 102 executing computer instructions stored in memory 104. As shown, the step of compression invocation begins with the transmission of an electronic signal (not shown) to the disk manager 110 requesting compression of data stored on the disk 121. Although not shown, a multiplicity of sources may cause the ultimate transmission of the electronic signal to the disk manager 110. For example, a user of the computer system 100 may enter a command requesting compression of data, or an executing program may automatically transmit run-time commands to initiate the step of invoking the compression process 200. The examples provided above are meant to be merely illustrative and thus, other sources may ultimately lead to transmission of the electronic signal to the disk manager 110 requesting compression of data stored on disk 121.

As shown in FIG. 2(a), the step 200 of invoking compression via transmission of an electronic signal triggers step 201, wherein an application (not shown) reads data records from disk 121 and writes the data records to memory. The application reads in data records stored in blocks(118, 120, 130, 132) from the disk 121. In a preferred embodiment, the application reads in 56K bytes, (i.e., 14 (4k) bytes) of data records stored in blocks, from the disk 121. Further, the data blocks, where possible, are arranged on the disk 121 to facilitate disk reads, such that the blocks (118,120,130,132) include consecutive data records (122,124 & 126,128 & 134,136 & 138,140) contiguous on the disk. In step 202, the disk manager 110 reads in the data records from cache memory 112.

The disk manager 110 of alternate embodiments could retrieve different units and/or amounts of data from disk 121. However, in determining the unit and/or amount of data to retrieve from disk, hardware and software considerations should be taken into account, such as overall RAM and cache memory size, and processor speed.

Figure 2B:
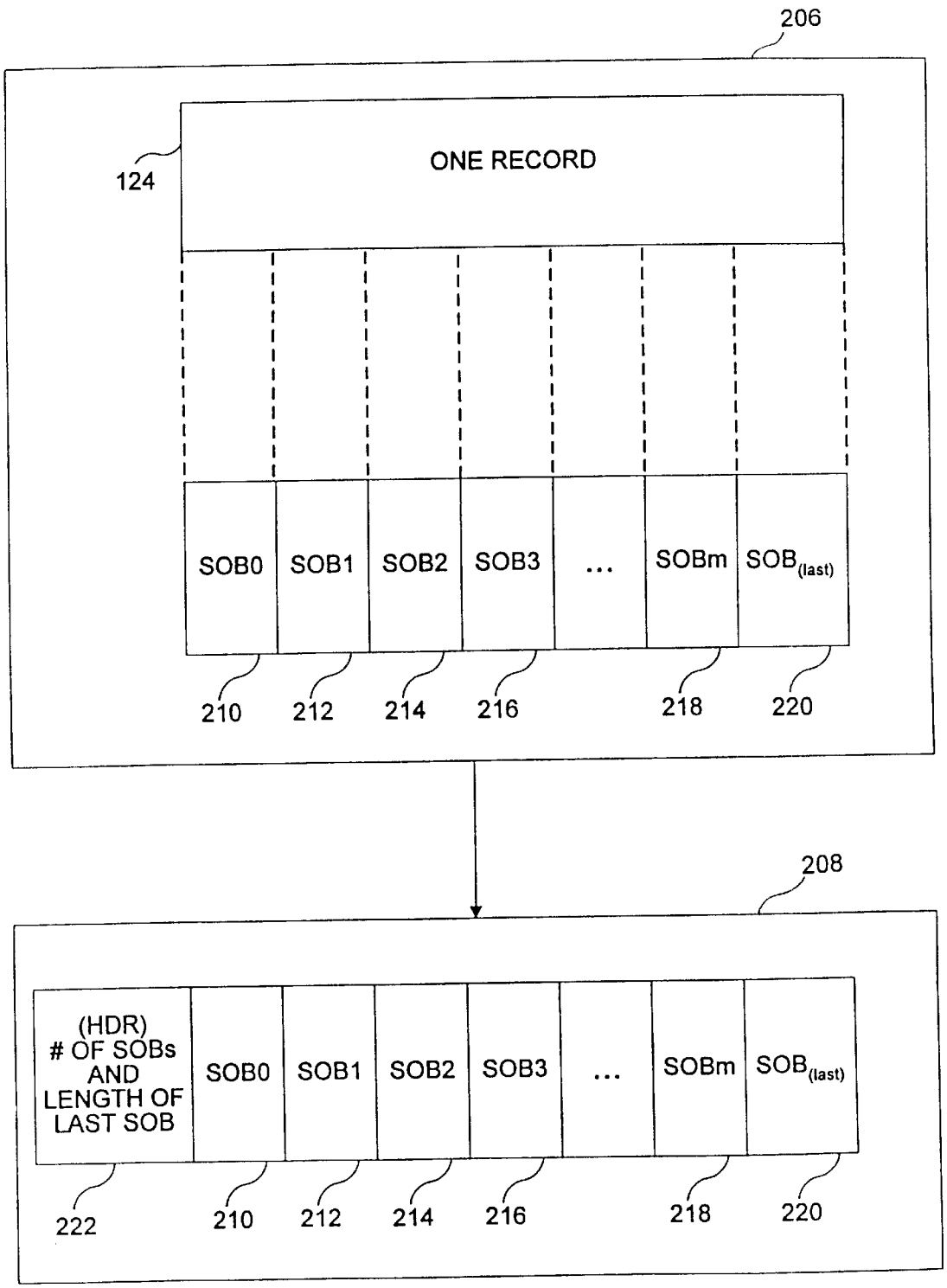
FIG. 2(b) is a diagram showing the steps of FIG. 2(a) of dividing each block record into SOBs, and of writing SOB record information to the header of the compression record, in accordance with the present invention.

In step 204 of FIG. 2(a), the disk manager 110 divides each record (e.g., record 122) into data of equal length known as Small Object Binary (SOBs). An exploded view of the step 204 of dividing a record into data of equal lengths is shown in FIG. 2(b). In a preferred embodiment, each SOB has a length of 4 bytes. Although a 4 byte SOB unit was determined to be an optimal length for modern processing in RISC based systems, alternate embodiments may ultimately choose a different SOB length. Factors determining whether the SOB length is efficient for compressing and decompressing data include, but are not limited to, the type of processor, operating system and DBMS.

In step 206 of FIG. 2(a), the disk manager 110 calculates and writes the number of SOBs and the length in bytes of the last SOB (SOB$_{(last)}$) 220 of the current record (rec$_N$) 124 to a header 222 of a compressed record 221 in memory 104. In a preferred embodiment, the header (HDR) 222 is 16 bits wide, such that bits <2:15> record the number of SOBs in the record and bits <0:1> record the length in bytes of SOB$_{(last)}$ 220. The information written to the header 222, as shown in FIG. 2(b), accounts for the SOB$_{(last)}$ 220 having in some instances a length less than the other SOBs. The purpose and importance of retaining information about the last SOB in the header will become readily apparent from the description of step 208 of compressing records in ascending order.

A preferred embodiment of the present invention includes a compression and decompression method and apparatus to compress SOBs of a current record (rec$_N$) in accordance with "like" data of corresponding SOBs of a previous record (rec$_{n-1}$). To limit disk I/O during data decompression, the first record (e.g., 122,126,134,138) in each block as shown in FIG. 1(b), is only partially compressed, so that decompressing a given block does not require access to other data blocks stored on disk.

Figure 2C:
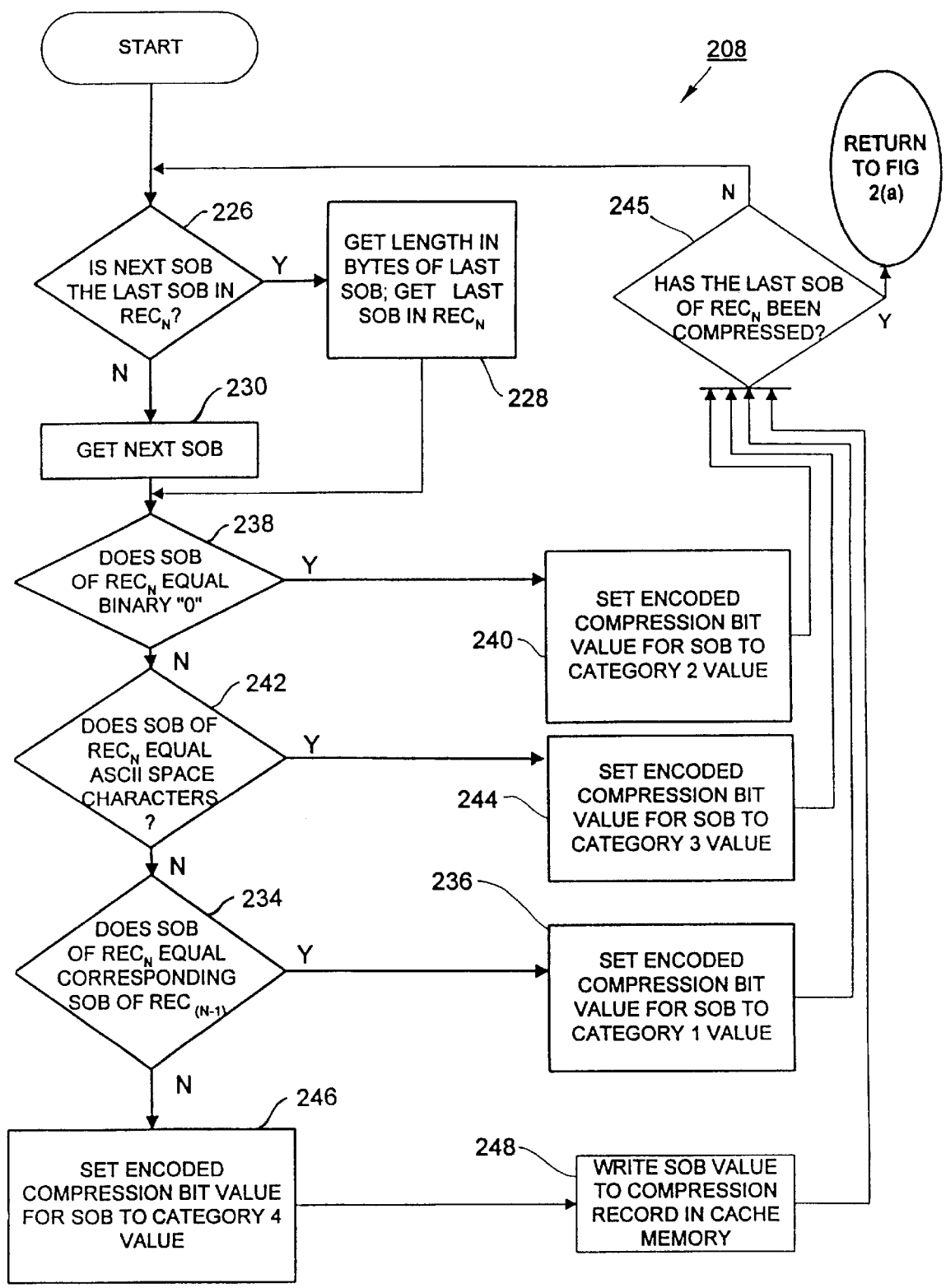
FIG. 2(c) is an expansion of step 208 of FIG. 2(a).

In step 208 of FIG. 2(a), the disk manager 110 performs compression processing of a current record. FIG. 2(c) shows an exploded view of step 208 including each sub-step of compressing the current record (rec$_N$) of the block. The sub-steps of FIG. 2(c) are repeated for each record in the block.

In FIG. 2(c), the SOBs of rec$_N$ are processed in ascending order. The compression process begins with sub-step 226, wherein the disk manager 110 accesses the current SOB (SOB$_{(n)}$) of the record undergoing compression. The disk manager determines, in step 226, whether the current SOB is SOB$_{(last)}$. If the current SOB is SOB$_{(last)}$, the disk manager 110, in step 228, reads the length of the last SOB from the header for the SOB, as determined in step 206. The disk manager 110 then reads the last SOB in accordance with the length. If, in step 230, the current SOB is not the last SOB of the record, the disk manager 110 reads the current SOB from memory 104 using the standard SOB length.

Figure 3:
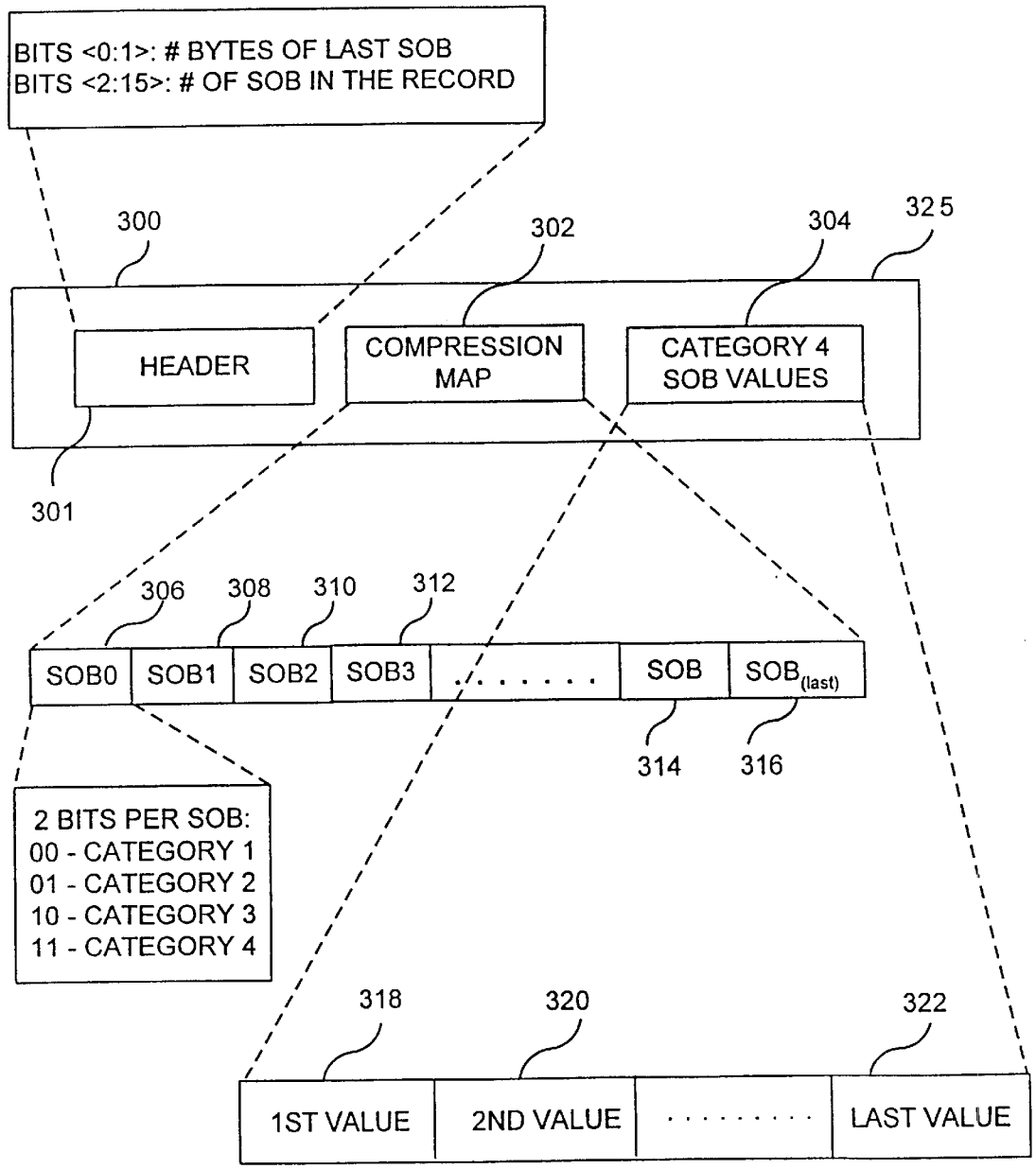
FIG. 3 is a diagram showing the format of one compressed record generated by the compression process of FIGS. 2(a) & 2(c).

A record is compressed by examining and categorizing each SOB in the record according to one of four category values. The SOBs are processed in groups of 8 to optimize data compression. For example, SOBs 7 . . . 0 are first categorized and written to disk, followed by SOBs 15 . . . 8. Thus, beginning with the last SOB of the first SOB group, a two bit encoded value of each SOB is written to the compression bit map 302 of a compression record 325, as shown in FIG. 3, as follows:

(1) in step 238, if the current SOB of rec$_N$ has a value of binary zero then in step 240 set the encoded value of the current SOB in the compression bit map of rec$_N$ to a category 2 value;

(2) in step 242, if the current SOB of rec$_N$ has a value of a sequence of ASCII space characters then in step 244 the encoded value of the current SOB is set in the compression bit map of $rec_N$ to a category 3 value;

(3) in step 234, if the current SOB of the $rec_N$ has the same value as the corresponding SOB of the $rec_{N-1}$ then in step 236 set the encoded value of the current SOB in the compression bit map of the $rec_N$ to a category 1 value; and (4) in step 246, if current SOB of $rec_N$ has a value equal to none of categories 1–3, then in step 246 the encoded value of the current SOB is set in the compression bit map for $rec_N$ to a category 4 value and in step 248 the value of the current SOB is written in memory 104 to a category 4 value.

After setting the current SOB encoded value in the compression bit map of $rec_N$, the disk manager 110, in step 245, determines if the last SOB of $rec_N$ was compressed. If the last SOB of $rec_N$ was not compressed, in step 230, the disk manager 110 accesses and subsequently encodes the next SOB as described above. If the last SOB of $rec_N$ was compressed, the disk manager 110, in step 209 (See FIG. 2(*a*)), reads the next record from memory, now referred to as the current record, $rec_N$, to begin data compression of that record. This compression process will continue until each SOB of each data record read from disk in step 201 is compressed by the disk manager 110.

As described above, the results of the above process are written to the current compression record. As shown in FIG. 3 the current compression record 300 written to memory 104 preferably includes three sections: a header 301, a compression bit map 302 and category 4 SOB values 304. The record's first section, the header 301 is 16 bits long, such that bits <0:1> record the number of bytes of the last SOB of the record and bits <2:15> record the number of SOBs in the record. For example, bits <0:1> indicate the number of bytes used in $SOB_{(last)}$ 316, and bits <1:15> indicate the number of SOBS in the record 300.

The second section of the record 300 is a compression bit map 302 that includes two-bit values identifying the compression category assigned to each SOB. For example, in a preferred embodiment, two-bit values representing one of four categories are sequentially written to the compression bit map 302 for each SOB ($SOB_0$ 306 through $SOB_{(last)}$ 316) of each record. Each SOB is assigned one of four categories according to the following: (1) if the current SOB of $rec_N$ has the same value as the corresponding SOB in the previous record then set the two-bit value of the compression bit map of $rec_N$ to category 1, "00"; (2) if the current SOB of $rec_N$ has a value equal to binary 0 then set the two-bit value of the compression bit map of $rec_N$ to category 2, "11"; (3) if the current SOB of $rec_N$ has a value equal to a sequence of ASCII space characters then set the two-bit value of the compression bit map of $rec_N$ to category 3, "10"; and (4) if the SOB has a value not equal to one of the above three categories then set the two-bit value of the compression bit map of $rec_N$ to category 4, "01". Alternate embodiments of the instant invention may assign bit values different from those described above.

In a preferred embodiment, the encoded compression bit value of each SOB of a block's first record are never set to category 1 because the first SOB of a record is never compressed in accordance with other records. Alternate embodiments of the instant invention may include compression bit map bit values having a length other than two bits. For example, an alternate embodiment may include a one bit compression bit map value for each SOB. However, an embodiment having a one bit compression bit map value does not take advantage of the compression gains of using categories 2 and 3, which are assigned to SOBs equal to binary zero and to ASCII spaces, respectively. The absence of categories 2 and 3 especially impact DSS databases since these databases generally include columns of data having values equal to ASCII spaces or binary "0". Thus, the inclusion of a two-bit compression bit map with categories 2 and 3, particularly in the case of DSS databases, promotes efficient database compression. Other embodiments of the instant invention may include SOB compression bit map values having a length of three bits or greater. However, effective compression of a sequence of records requires a comparatively smaller space overhead to store a compression bit value for each SOB than to store the actual value of each SOB. These examples of compression bit maps are merely illustrative of the numerous embodiments available for defining a compression bit map scheme and are not meant to limit application of this process and apparatus in the instant invention.

The third section of the compressed record 300 is Category 4 SOB values 304. Category 4 SOB values 304 include SOBs having a value not equal to either: (1) a corresponding SOB in the previous record; (2) binary zero; or (3) sequence of ASCII space characters. In a preferred embodiment, each SOB has a length of 4 bytes. However, because each record may have unequal lengths, a category 4 value of $SOB_{(last)}$ 322 may have a length in bytes less than the preferred SOB length of 4 bytes. The length of $SOB_{(last)}$ will be stored in the header 301 of the compression record 300, in bits <0:1>.

The previous paragraphs discuss how to initially compress uncompressed data. The following paragraphs discuss how to access compressed data.

Figure 4A:
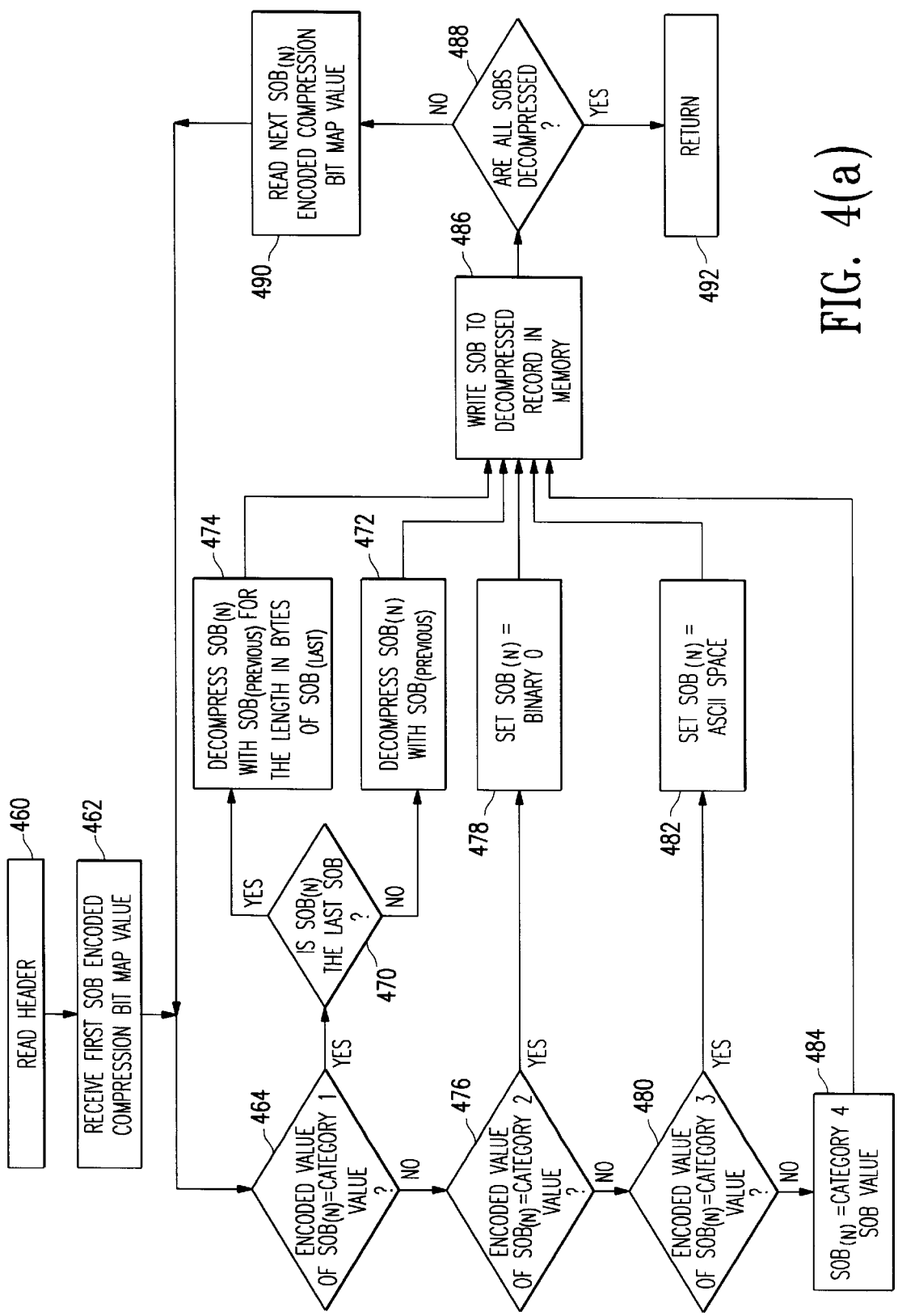
FIG. 4(a) is a flowchart showing the decompression process where an expanded version of the prior record is available.
Figure 4B:
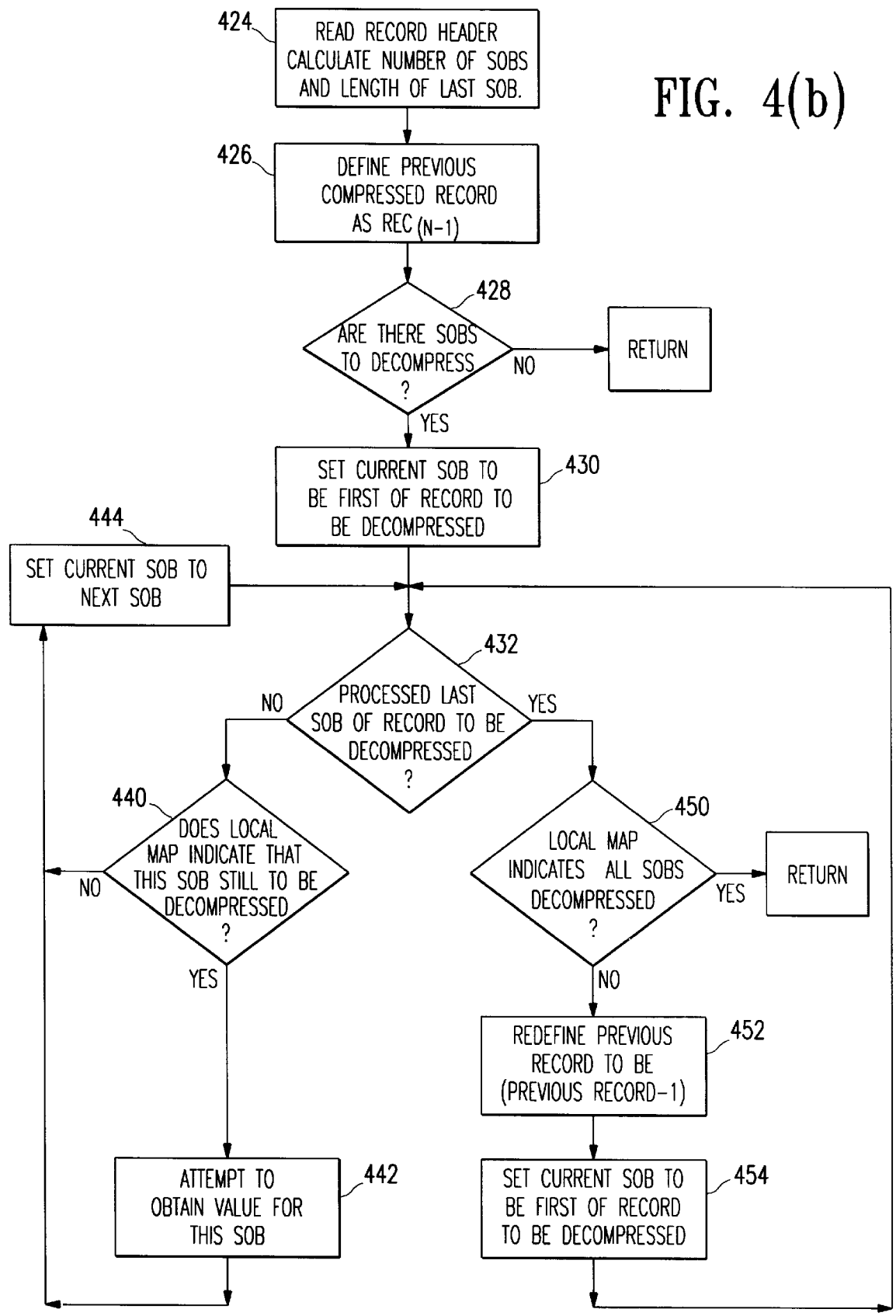
FIG. 4(b) is a flowchart showing the decompression process of a record where the prior record is compressed.
Figure 4C:
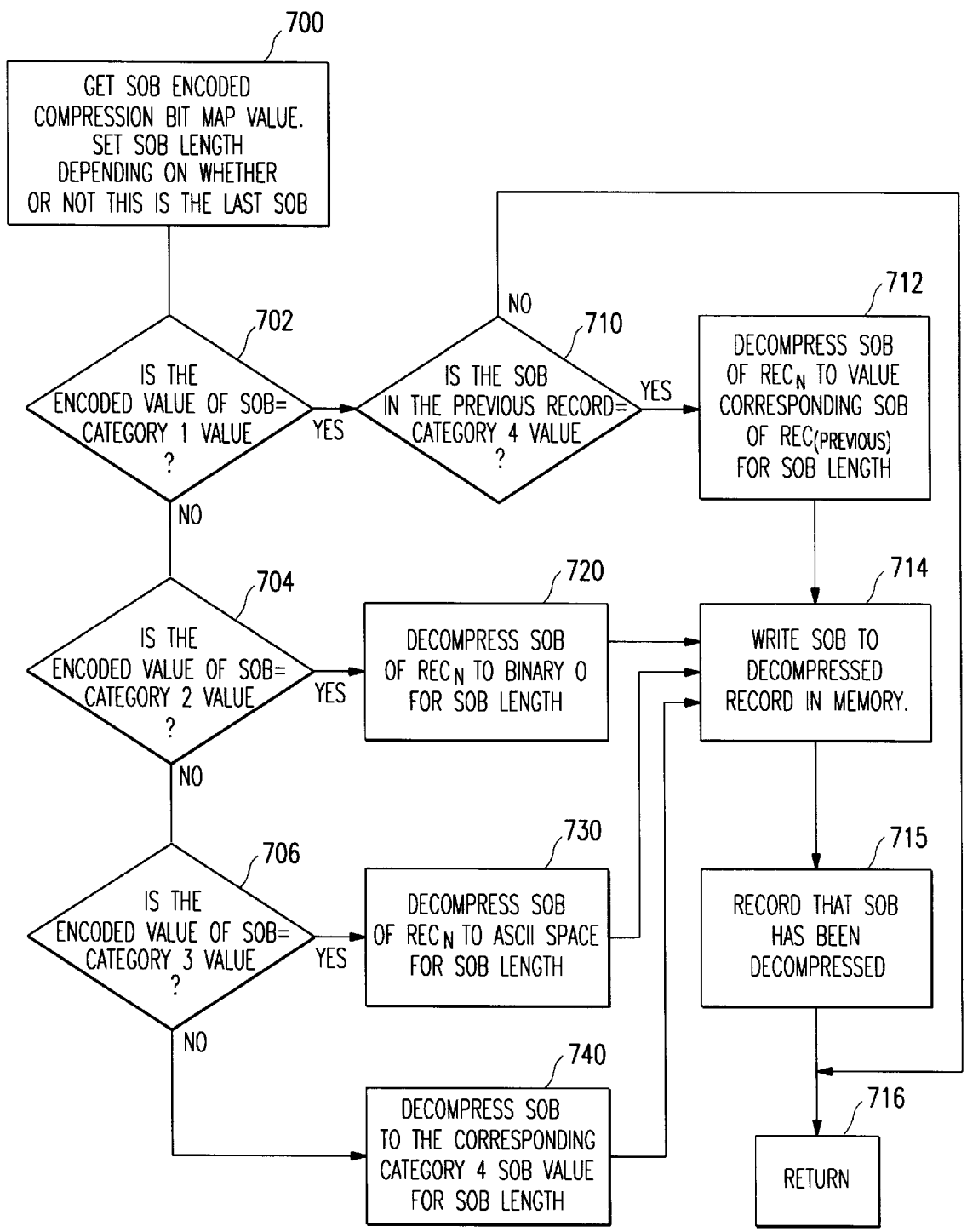
FIG. 4(c) is a flowchart showing the difference decompression process.

As shown by the FIGS. 4(*a*), 4(*b*) and 4(*c*), the current record to decompress is ($rec_N$) and the last record is (rec $_{(last)}$). FIG. 4(*a*) shows the Decompress2 process of decompressing $rec_N$ when the uncompressed version of the previous record is available. In step 460, the disk manager 110 reads from the header 110 of $rec_N$ the number of bytes of $SOB_{(last)}$ and the number of SOBs in $rec_{(N)}$. Next, in step 462, the disk manager 110 reads the first SOB encoded compression bit map value. A preferred embodiment of the instant invention provides optimized decompression by processing SOBs in groups of eight. For example, the disk manager 110 compares SOB 7 . . . 0 of the current and previous record, followed by SOB 15 . . . 8. Thus, decompression begins at the last SOB of the first SOB group of the record located at the start position, or if no start position is known, at the first record of the database partition. The disk manager 110 reads the two-bit compression bit map value of each SOB of $rec_N$ according to the following case step:

(1) In step 464, if the encoded value of the current SOB in the compression bit map of $rec_N$ is set to a category 1 value and the current SOB of $rec_N$ has a value equal to the corresponding SOB of the previous record. The disk manager 110, in step 470, determines if the current SOB of $rec_N$ is $SOB_{(last)}$. If the current SOB is $SOB_{(last)}$, then in step 474 the current SOB obtains the value of the corresponding SOB of the previous record for the length in bytes of $SOB_{(last)}$ of $rec_N$ else in step 472, the current SOB obtains the value of the corresponding SOB of the previous record.

(2) In step 476, if the encoded value of the current SOB of $rec_N$ in the compression bit map is set to a category 2 value then in step 478 the current SOB of $rec_N$ obtains a value of binary zero. If the current SOB is $SOB_{(last)}$ then the current SOB will obtain a value of binary zero equal to the length in bytes of $SOB_{(last)}$.

(3) In step 480, if the encoded value of the current SOB in the compression bit map of $rec_N$ is set to a category 3 value then in step 482 the current SOB of $rec_N$ obtains a value of a sequence of ASCII space characters. If the current SOB is $SOB_{(last)}$ then the current SOB obtains a value of ASCII space characters equal to the length in bytes of $SOB_{(last)}$.

(4) In step 484, if the encoded value of the current SOB in the compression bit map of $rec_N$ is set to a category 4 value then the current SOB of $rec_N$ obtains the value of the corresponding category 4 SOB value.

In step 486, the disk manager 110 writes the current SOB to a record in memory 104. The disk manager 110 in step 488 determines whether all the SOBs of $rec_N$ are decompressed. If all the SOBs of $rec_N$ are not decompressed, in step 490, the disk manager 110 retrieves and begins to decompress the next SOB encoded compression bit map value of $rec_N$.

FIG. 4(*a*) shows decompression of a record when the expanded version of the previous record is available. In contrast, FIG. 4(*b*) shows a flowchart of the process to decompress a record $rec_{(N)}$ when the previous record is compressed.

The disk manager 110 first determines if the data block containing the requested record is in cache memory 112 (not shown). If not, the disk manager 110 reads and copies from disk 114 to cache memory 112 the data block inclusive of the requested record (not shown). Next in step 424, the disk manager 110 reads from the header of $rec_N$ the number of bytes of $SOB_{last}$ and the number of SOBs in $rec_N$. In step 426, the disk manager 110 defines the previous compressed record as $rec_{N-1}$. In step 428, the disk manager determines if there are SOBs to decompress. If there are SOBS to decompress, in step 430, the disk manager 110 defines the first SOB of $rec_N$ to be decompressed as $SOB_{current}$. Similar to the compression process, a preferred embodiment of the instant invention provides optimized decompression by processing SOBs in groups of eight.

In step 432 the disk manager 110 determines if the last SOB of $rec_N$ has been decompressed. If not, in step 440, the disk manager 110 checks a local map stored in memory 104 to determine whether $SOB_{current}$ is still compressed. If $SOB_{current}$ is still compressed then in step 442, the disk manager begins a decompression process to obtain a value for $SOB_{current}$.

FIG. 4(*c*) shows in detail the decompression process of step 442 of FIG. 4(*b*). In step 700, the disk manager 110 retrieves the encoded compression bit map value of $SOB_{current}$. If $SOB_{current}$ is the last SOB, the disk manager 110 sets the length of the SOB according the length in bytes of the last SOB as stored in the header of $rec_N$. The disk manager 110 processes $SOB_{current}$ according to the value of the two-bit compression bit map value as follows:

If the encoded value of $SOB_{current}$ in the compression bit map of $rec_N$ is determined in step 702 to equal a category 1 value and if in step 710, the corresponding SOB of the previous record is a category 4 value, then the disk manager 110, in step 712, obtains the value of the corresponding SOB in the previous record for the length in bytes determined in step 700. The assigned value is stored as the decompressed $SOB_{current}$ in step 714. Next, the disk manager 110 in step 715, updates the local map to record that $SOB_{current}$ has been successfully decompressed and returns in step 716 to compression processing of FIG. 4(*b*).

If the encoded value of $SOB_{current}$ in the compression bit map of $rec_N$ is determined in step 704 to equal a category 2 value then in step 720, $SOB_{current}$ is assigned the value of binary zero for the number of bytes determined in step 700. The assigned value is stored as the decompressed $SOB_{current}$ in step 714. Next, the disk manager 110, in step 715, records in the local map that the decompression was successful and returns in step 716 to compression processing of FIG. 4(*b*).

If the encoded value of $SOB_{current}$ in the compression bit map of $rec_N$ is determined in step 706 to have a category 3 value then, in step 730, $SOB_{current}$ of $rec_N$ is assigned the value of a sequence of ASCII space characters for the number of bytes determined in step 700. The assigned value is stored as the decompressed $SOB_{current}$ in step 714. Next, the disk manager 110, in step 715, records in a local map that $SOB_{current}$ has been successfully decompressed and returns in step 716 to compression processing of FIG. 4(*b*).

If the encoded value of $SOB_{current}$ in the compression bit map of $rec_N$ is not equal to any of categories 1 through 3, then it must be a category 4 value. In step 740, $SOB_{current}$ of $rec_N$ is assigned the corresponding category 4 SOB value for the number of bytes determined in step 700. The assigned value is stored as the decompressed $SOB_{current}$ in step 714. Next, the disk manager 110, in step 715, records that $SOB_{current}$ has been successfully decompressed and returns to compression processing in step 716.

Now returning to FIG. 4(*b*), the disk manager 110 in step 444 defines $SOB_{current}$ as the next SOB in $rec_N$. Next, the disk manager 110 returns to step 432.

If the last SOB of $rec_N$ has been processed then the disk manager 110, in step 450, determines whether all SOBs of $rec_N$ have been decompressed. If all the SOBs of $rec_N$ have been decompressed then decompression processing of $rec_N$ is complete. If all the SOBs of $rec_N$ have not been decompressed, then it is necessary to repeat the decompression process for the SOBs of $rec_N$ by redefining, in step 452, $rec_{previous}$ to the record prior to $rec_{previous}$. In step 454, the disk manager 110, resets $SOB_{current}$ as the first SOB of $rec_N$ and then initiates the decompression process in step 432. This iterative process of attempting to decompress all the SOBs not yet decompressed in $rec_N$ will continue to decrement $rec_{previous}$ (e.g., records (n−1), (n−2), (n−3)) until decompression of all SOBs in $rec_N$ occurs.

Figure 7:
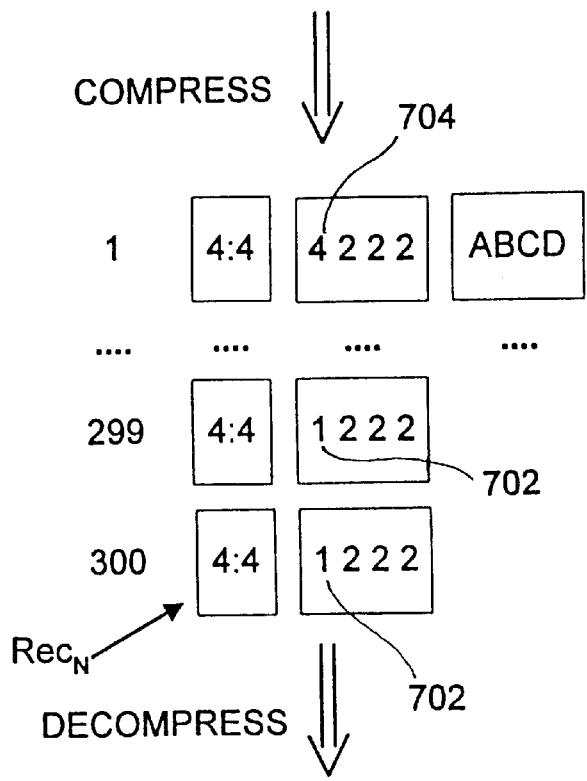
FIG. 7 is an example of records, where an early record in a block must be accessed to decode a much later record in the block.

FIG. 7 shows an example in which the disk manager 110 must examine a large number of previous records in order to decompress a current $rec_N$. In the example, all records have "ABCD" in their first bytes. Thus, the first compression bit map value 702 for each record (except the first record) has a category 1 value. To decompress record $rec_N$, the disk manager must examine each previous record until it encounters compression bit map value 704.

Figure 5:
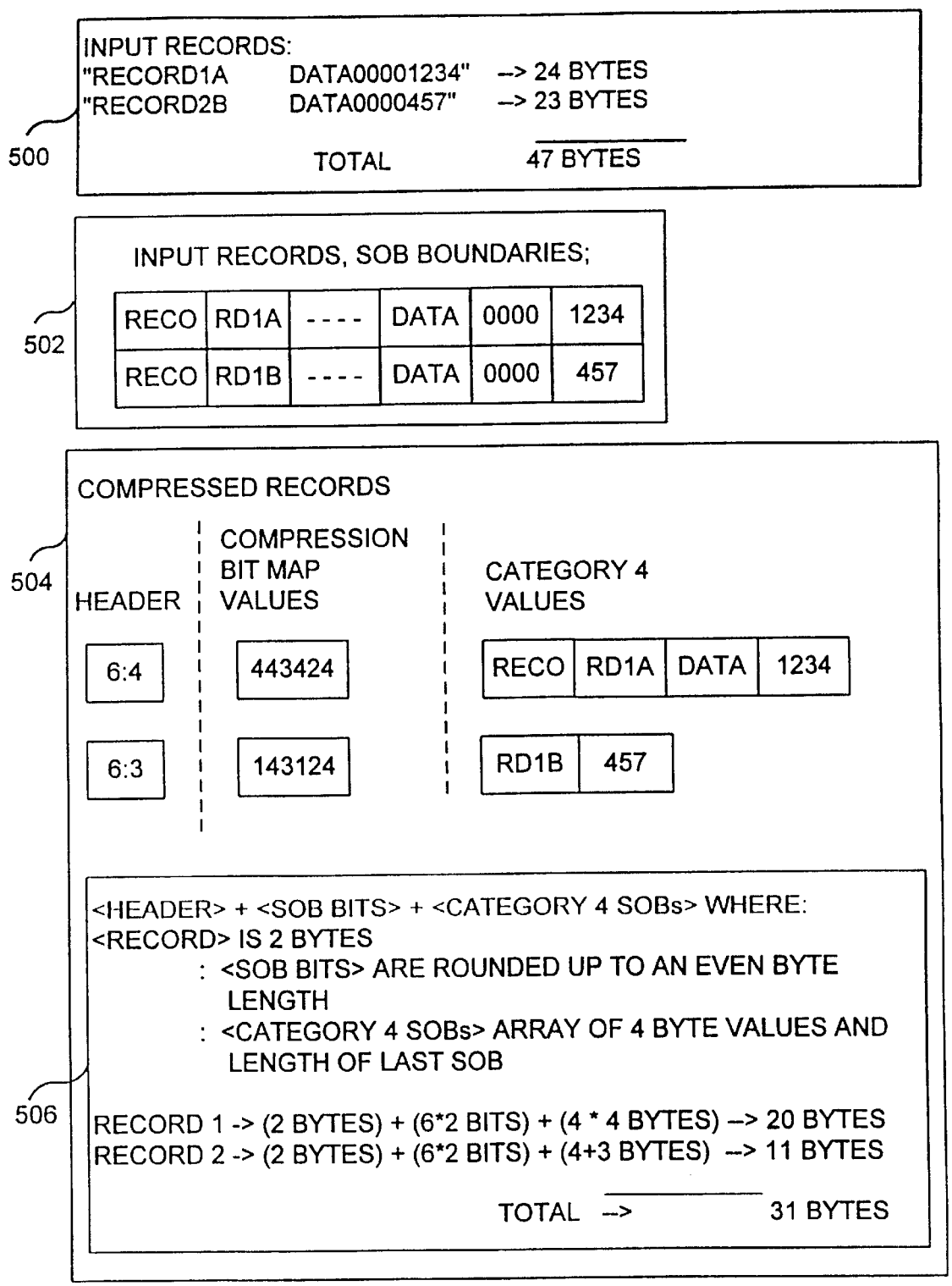
FIG. 5 is an example showing the compression process of FIGS. 2(a) and 2(b) as applied to two input data records to create two corresponding output compression records, each record having a format as shown by FIG. 3.

FIG. 5 is a diagram showing the compression process of FIGS. 2(*a*) and 2(*c*) as applied to two input data records to create two corresponding output compression records, each record having a format as shown by FIG. 3. Block 500 shows the two input records, one input record having a length of 24 bytes and the other input record having a length of 23 bytes for a total of 47 bytes. Block 502 shows the two input records after each record, with the exception of $SOB_{(last)}$, are divided into SOBs of equal length. A preferred embodiment defines the SOB length as 4 bytes.

Block 504, shows the two input records in a compressed format, each compressed record including a header, encoded compression bit map and category 4 values. The header of the first compressed record shows 6 SOBs with $SOB_{(last)}$ having a length of 4 bytes. The header of the second compressed record shows 6 SOBS with $SOB_{(last)}$ having a length of 3 bytes. The SOB compression bit map shows a category assigned to each SOB. A category 4 value corresponds to an SOB that is not compressed, a category 3 value corresponds to an SOB having a value equal to a series of ASCII space characters, a category 2 value corresponds to an SOB having a value equal to binary "0" and a category 1 value corresponds to an SOB having a value equal to the corresponding SOB of a previous record.

Block 506 shows in detail the record length of the compressed records including the header, compression bit map values and the category 4 SOBs. The length of the first record is 20 bytes including: a 2 byte header, a 12 bit compression bit map, and 4 bytes for each of the 4 category 4 SOB values. The compression bit map is rounded up to an even byte length (e.g., 2 bytes). The length of the second record is 11 bytes including: a header of 2 bytes, a 12 bit compression bit map, 4 bytes for the first category 4 value, and 3 bytes for the length of the last category 4 value. Thus, applying the difference compression method and apparatus of the invention disclosed herein, two records having a total length of 47 bytes are compressed to a length of 31 bytes.

Figure 6:
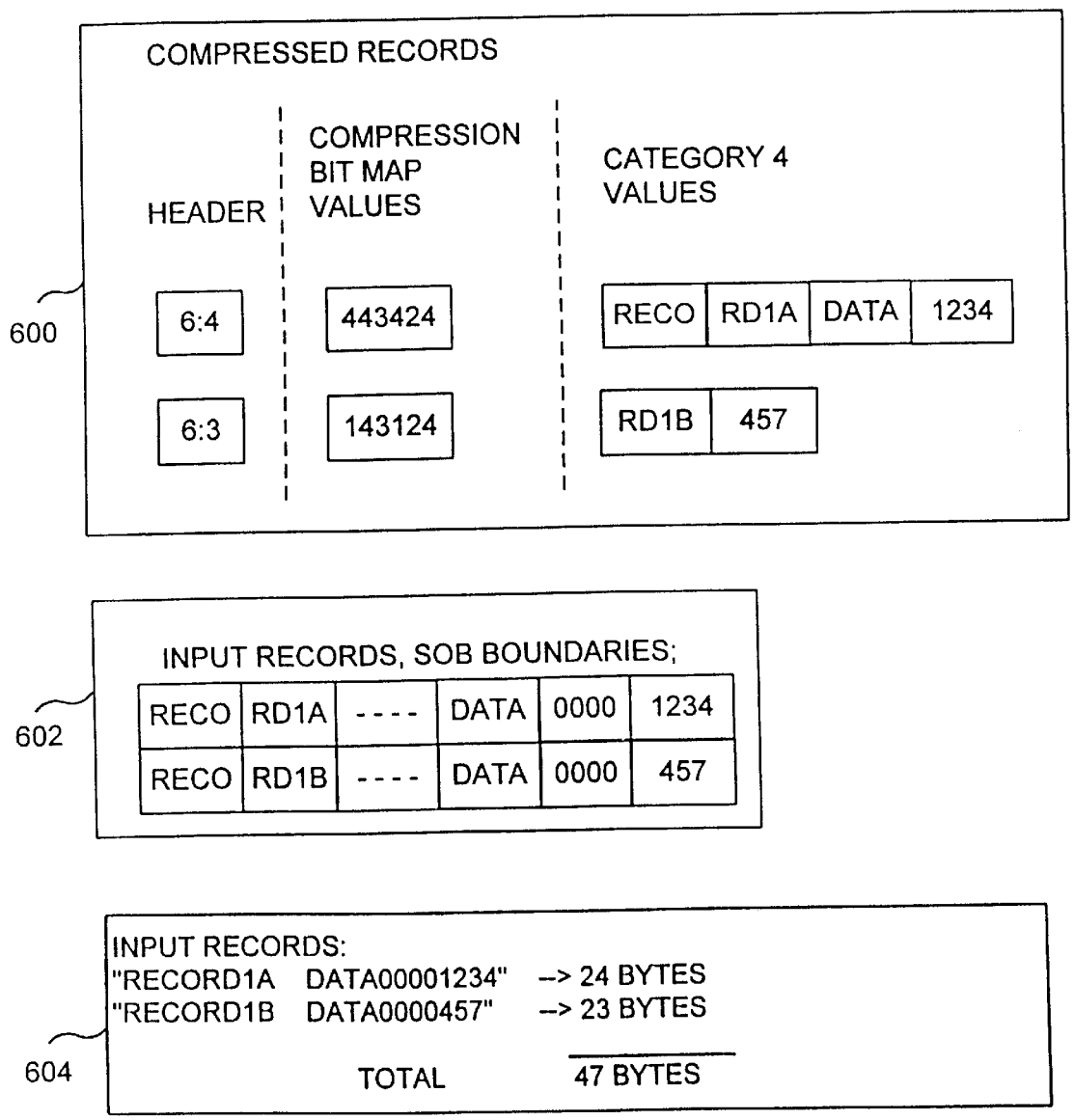
FIG. 6 is an example showing the decompression process of FIG. 4(c) as applied to the two output compression records of FIG. 5.

FIG. 6 is a diagram showing the decompression process of FIGS. 4(*a*) and 4(*b*) as applied to the two output compression records of FIG. 5. Block 600 shows each of the two compressed records including the header, compression bit map value and category 4 values. Block 602 shows the two records decompressed into the expanded SOB values. The process of decompressing the two records is as follows: (1) the disk manager 110 reads the header of the second record to determine the number of SOBs and length in bytes of the last SOB; and, (2) the disk manager 110 reads each SOB encoded compression bit map value to identify the category of each SOB and the corresponding process to decompress that category type. For example, the first compression bit map value is a "1". Thus, the SOB gets the first corresponding SOB value of the previous record, "RECO". The second compression bit map value is a "4." Thus, the SOB gets the category 4 value "RD1B". The third compression bit map value is a "3". Thus, the SOB gets an ASCII space value. The fourth compression bit map value is a "1". Thus, the SOB gets the corresponding SOB of the previous record "DATA". The fifth compression bit map value is a "2". Thus, the SOB gets a value of binary "0". The sixth compression bit map value is a "4", and is $SOB_{(last)}$. Thus, the SOB gets the category 4 value "457" for a length of "3" bytes as defined in the header. Decompression of the first record will follow the same process. However, to limit disk I/O's, the first record will not include category "1" values, so that decompression of a given record does not require access to a prior data block. The above example is for illustrative purposes only, and should not be construed to limit the numerous applications of this invention for compressing and decompressing records.

Although not shown, a DBMS 108 data processing request that alters the expanded (decompressed) version of a record (n–1) will require re-compression of record ("n"). Insert, delete and update are three examples of DBMS 108 data processing requests described below that require re-compression of record ("n").

For example, to insert a record at position (n), record (n+1), if it exists in the data block, must be re-compressed relative to the expanded version of the inserted record. The re-compression of record (n+1) relative to the expanded record currently at position (n) is required before the record insertion, Thus, an expanded version of record (n+1) is first obtained prior to performing the re-compression of record (n+1).

To delete a record at position (n), the record at position (n+1), if it exists in the data block, must be re-compressed relative to record (n–1). The re-compression of record (n+1) occurs without obtaining an expanded copy of either record (n+1) or record (n–1). Rather, if an SOB of an expanded copy of record (n+1) is marked as having a value equal to the corresponding SOB of the decompressed previous record and the value of this SOB is also in the compressed form of record (n), then the value is transferred to the compressed version of record (n+1). The compression bit map corresponding to record (n+1) is updated to show that the value of this SOB is included in the compressed version of record (n+1).

To update a record at position (n), there is a new expanded version of record (n), referred to as (n'). If record (n–1) exists, record (n') is compressed relative to an expanded version of it, and the compressed version of (n') replaces the compressed version of (n) in the data block. Also, record (n+1) must be re-compressed relative to an expanded version of record (n').

Several preferred embodiments of the present invention have been described. Nevertheless, it will be understood that various modifications may be made without departing from the spirit and scope of the invention.

In describing the preferred embodiments, a number of specific technologies used to implement the embodiments of various aspects of the invention were identified and related to more general terms in which the invention was described. However, it should be understood that such specificity is not intended to limit the scope of the claimed invention.

We claim:

1. A record difference compression method of compressing a plurality of records of bytes of data, said plurality of records having bytes identical between a current record and a previous record, said method performed by a data processing system having a memory, comprising the steps of:

dividing said current record and said previous record each into a plurality of small object binary;

comparing said small object binary of said current record to said corresponding small object binary of said previous record;

setting bits to a first type value in a compression bit map of a compression record for each of said small object binary of said current record that are equal to said one of said corresponding small object binary of said previous record;

setting bits to a second type value in said compression bit map of said compression record for each of said small object binary of said current record that are not equal to said one of said corresponding small object binary of said previous record; and writing said small object binary to said compression record for each of said small object binary of said current record not equal to said corresponding small object binary of said previous record.

2. The method according to claim 1 further including after said step of setting bits of a first type value, a step of setting bits of a third type value in said compression bit map of said compression record for each of said small object binary of said current record equal to a first predetermined value.

3. The method according to claim 2, wherein in said step of setting bits of a third type value, said first predetermined value has a value equal to ASCII space characters.

4. The method according to claim 2 further including after said step of setting bits of a third type value, a step of setting bits of a fourth type value in said compression bit map of said compression record for each of said small object binary equal to a second predetermined value.

5. The method according to claim 4, wherein said second predetermined value has a value equal to binary zero.

6. The method according to claim 1 further including after said dividing step, a step of writing a header of said compression record, said header specifying a number of said small object binary of said current record, and said length of said last one of said small object binary.

7. The method according to claim 6, wherein if said last small object binary of said current record is said last one, said step of comparing includes the step of comparing said last small object binary of said current record to said small object binary of said previous record for said length of said last small object binary.

8. A record difference decompression method of decompressing a plurality of compressed records of bytes of data, said plurality of compressed records having a current record and a previous record, said current record and said previous record each having a header and a compression bit map, said compression bit map of said current record including at least one encoded bit map value corresponding to a compressed small object binary, said method performed by a data processing system having a memory comprising the steps of:

receiving a request for a compressed record;

accessing the compressed record as said current record and accessing said previous record in said data processing system;

reading said encoded bit map value of said compression bit map of said current record;

decoding said current record, wherein if said encoded bit map value has a first type value then said small object binary of said current record is decompressed to a value of said corresponding small object binary of the previous record, wherein if said encoded bit map value has a second type value then said small object binary of said current record is decompressed to a value of said corresponding small object binary of the current record;

writing said small object binary to a decompressed record in the memory of said data processing system; and returning said decompressed record.

9. The method according to claim 8, wherein the decoding step further includes a step of decoding a third type value wherein if said encoded bit map value has a third type value said small object binary of said current record is decompressed to a first predetermined value.

10. The method according to claim 9, wherein said first predetermined value has a value of ASCII spaces.

11. The method according to claim 8, wherein the decoding step further includes a step of decoding a fourth type value wherein if said encoded bit map value has a fourth type value said small object binary of said current record is decompressed to a second predetermined value.

12. The method according to claim 11, wherein said second predetermined value has a value of binary zero.

13. The method according to claim 8 further including the step of reading a header of said current compressed record, said header including a number of said small object binary of said current record and a length of a last of said small object binary, if one of said small object binary is said last one of said small object binary of said current record, for said decoding step, said last one of said small object binary of said current record is decompressed to a value of said corresponding one of said small object binary of said previous record for said length of said last small object binary.

14. An apparatus for providing compression of sequential records, the apparatus comprising:

a first portion configured to divide a current record and a previous record each into a plurality of small object binary of equal length;

a second portion configured to set bits to a first type value in a compression bit map of a compression record for each of said small object binary of said current record that are equal to said one of said corresponding small object binary of said previous record;

a third portion configured to set bits to a second type value in said compression bit map of said compression record for each of said small object binary of said current record that are not equal to said one of said corresponding small object binary of said previous record and are not equal to a first predetermined value and are not equal to a second predetermined value;

a fourth portion configured to write said small object binary to said compression record for each of said small object binary of said current record not equal to said corresponding small object binary of said previous record;

a fifth portion configured to set bits of a third type value in said compression bit map of said compression record for each of said small object binary of said current record equal to a first predetermined value; and a sixth portion configured to set bits of a fourth type value in said compression bit map of said compression record for each of said small object binary equal to a second predetermined value.

15. An apparatus for providing decompression of sequential records, the apparatus comprising:

a first portion configured to receive a request for a compressed record;

a second portion configured to access the compressed record as a current record and to access a previous record in said data processing system;

a third portion configured to read an encoded bit map value of a compression bit map value of said current record;

a fourth portion configured to decode said current record, wherein if said encoded bit map value has a first type value then said small object binary of said current record is decompressed to a value of said corresponding small object binary of said previous record, wherein if said encoded bit map value has a second type value then said small object binary of said current record is decompressed to a value of said corresponding small object binary of the current record, wherein if said encoded bit map value has a third type value said small object binary of said current record is decompressed to a first predetermined value, wherein if said encoded bit map value has a fourth type value said small object binary of said current record is decompressed to a second predetermined value;

a fifth portion configured to write said small object binary to a decompressed record in memory of a data processing system; and a sixth portion configured to return said decompressed record.

16. A computer program product comprising:

a computer usable medium have a computer readable code embodied therein for causing compression of sequential records, the computer program product comprising:

a first computer readable program code device configured to cause a computer to effect division of said current record and said previous record each into a plurality of small object binary of equal length;

a second computer readable program code devices configured to cause a computer to effect setting bits to a first type value in a compression bit map of a compression record for each of said small object binary of said current record that are equal to said one of said corresponding small object binary of said previous record;

a third computer readable program code devices configured to cause a computer to effect setting bits to a second type value in said compression bit map of said compression record for each of said small object binary of said current record that are not equal to said one of said corresponding small object binary of said previous record and are not equal to a first predetermined value and are not equal to a second predetermined value; a fourth computer readable program code devices configured to cause a computer to effect writing said small object binary to said compression record for each of said small object binary of said current record not equal to said corresponding small object binary of said previous record;

a fifth computer readable program code devices configured to cause a computer to effect setting bits of a third type value in said compression bit map of said compression record for each of said small object binary of said current record equal to the first predetermined value; and a sixth computer readable program code devices configured to cause a computer to effect setting bits of a fourth type value in said compression bit map of said compression record for each of said small object binary equal to the second predetermined value.

17. A computer program product comprising:

a computer usable medium having a computer readable code embodied therein for causing decompression of compressed sequential records, the computer program product comprising:

a first computer readable program code devices configured to cause a computer to effect receiving of a request for a compressed record;

a second computer readable program code devices configured to cause a computer to effect access of the compressed record as said current record and access of said previous record in said data processing system;

a third computer readable program code devices configured to cause a computer to effect reading said encoded bit map value of said compression bit map value of said current record;

a fourth computer readable program code devices configured to cause a computer to effect decoding of said current record, wherein if said encoded bit map value has a first type value then said small object binary of said current record is decompressed to a value of said corresponding small object binary of said previous record, wherein if said encoded bit map value has a second type value then said small object binary of said current record is decompressed to a value of said corresponding small object binary of the current record, wherein if said encoded bit map value has a third type value said small object binary of said current record is decompressed to a first predetermined value, wherein if said encoded bit map value has a fourth type value said small object binary of said current record is decompressed to a second predetermined value;

a fifth computer readable program code devices configured to cause a computer to effect writing said small object binary step to a decompressed record in the memory of said data processing system; and a sixth computer readable program code devices configured to cause a computer to effect returning of said decompressed record.

* * * * *